(12) United States Patent
Matsunaga

(10) Patent No.: US 10,405,244 B2
(45) Date of Patent: Sep. 3, 2019

(54) COMMUNICATION METHOD, SYSTEM, AND DEVICE

(71) Applicant: Panasonic Intellectual Property Management Co., Ltd., Osaka (JP)

(72) Inventor: Shigeki Matsunaga, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 467 days.

(21) Appl. No.: 14/892,546

(22) PCT Filed: Dec. 2, 2014

(86) PCT No.: PCT/JP2014/006012
§ 371 (c)(1),
(2) Date: Nov. 19, 2015

(87) PCT Pub. No.: WO2015/087508
PCT Pub. Date: Jun. 18, 2015

(65) Prior Publication Data
US 2016/0105826 A1 Apr. 14, 2016

(30) Foreign Application Priority Data
Dec. 12, 2013 (JP) .................................. 2013-256897

(51) Int. Cl.
*H04W 84/12* (2009.01)
*H04W 36/00* (2009.01)
(Continued)

(52) U.S. Cl.
CPC .... *H04W 36/0022* (2013.01); *H04N 21/4126* (2013.01); *H04N 21/41407* (2013.01);
(Continued)

(58) Field of Classification Search
CPC ....... H04W 84/12; H04W 88/06; H04W 8/26; H04W 48/18; H04W 68/00; H04W 76/10;
(Continued)

(56) References Cited

U.S. PATENT DOCUMENTS

2005/0003822 A1\* 1/2005 Aholainen ............ H04W 28/18
455/445
2005/0201540 A1\* 9/2005 Rampey .................. G10L 15/22
379/142.14
(Continued)

FOREIGN PATENT DOCUMENTS

JP  2004-350109 A  12/2004
JP  2007-267407 A  10/2007
(Continued)

OTHER PUBLICATIONS

International Search Report of PCT application No. PCT/JP2014/006012 dated Feb. 24, 2015.
(Continued)

*Primary Examiner* — Charles N Appiah
*Assistant Examiner* — Xiang Zhang
(74) *Attorney, Agent, or Firm* — McDermott Will & Emery LLP

(57) ABSTRACT

A communication method is a communication method for communicating between first device and second device over one of first network and second network, and includes transmitting a common identifier from the first device to the second device over one of the first network and the second network, the common identifier being for uniquely specifying the first device in both the first network and the second network, receiving the common identifier at the second device, and communicating between the first device and the second device over one of the first network and the second network.

9 Claims, 10 Drawing Sheets

(51) Int. Cl.
*H04W 92/18* (2009.01)
*H04N 21/41* (2011.01)
*H04N 21/414* (2011.01)
*H04N 21/422* (2011.01)
*H04N 21/4227* (2011.01)
*H04N 21/436* (2011.01)
*H04N 21/4363* (2011.01)
*H04N 21/472* (2011.01)
*H04N 21/63* (2011.01)
*H04W 76/11* (2018.01)
*H04W 88/06* (2009.01)
*H04N 21/00* (2011.01)
*H04W 76/16* (2018.01)
*H04W 76/14* (2018.01)

(52) U.S. Cl.
CPC ..... *H04N 21/4222* (2013.01); *H04N 21/4227* (2013.01); *H04N 21/43615* (2013.01); *H04N 21/43637* (2013.01); *H04N 21/47217* (2013.01); *H04N 21/631* (2013.01); *H04W 76/11* (2018.02); *H04W 92/18* (2013.01); *H04N 21/00* (2013.01); *H04W 76/14* (2018.02); *H04W 76/16* (2018.02); *H04W 88/06* (2013.01)

(58) Field of Classification Search
CPC .... H04W 8/20; H04W 92/02; H04L 41/0806; H04L 47/785; H04L 69/18
USPC ........................................... 455/552.1, 553.1
See application file for complete search history.

(56) References Cited

U.S. PATENT DOCUMENTS

| | | | |
|---|---|---|---|
| 2007/0086383 A1* | 4/2007 | Watanabe | H04W 36/0011 370/331 |
| 2007/0214232 A1 | 9/2007 | Belimpasakis et al. | |
| 2007/0299780 A1* | 12/2007 | Vanska | G06F 21/10 705/59 |
| 2008/0279132 A1 | 11/2008 | Noishiki et al. | |
| 2009/0215438 A1* | 8/2009 | Mittal | H04M 3/42195 455/418 |
| 2010/0022224 A1* | 1/2010 | Li | H04M 1/72538 455/414.1 |
| 2010/0220697 A1 | 9/2010 | Liu et al. | |
| 2012/0158892 A1 | 6/2012 | Ichie et al. | |
| 2013/0227149 A1* | 8/2013 | Athlur | H04L 67/14 709/227 |
| 2013/0298196 A1* | 11/2013 | Yue | H04W 12/08 726/3 |
| 2013/0326077 A1 | 12/2013 | Seo | |
| 2014/0032634 A1* | 1/2014 | Pimmel | H04L 65/4076 709/203 |
| 2015/0126126 A1* | 5/2015 | Lee | H04L 12/2816 455/41.3 |

FOREIGN PATENT DOCUMENTS

| | | |
|---|---|---|
| JP | 2008-283524 | 11/2008 |
| JP | 2009-500896 A | 1/2009 |
| JP | 2009-296084 A | 12/2009 |
| JP | 2010-263438 | 11/2010 |
| JP | 2012-134709 | 7/2012 |
| JP | 2013-123143 | 6/2013 |
| JP | 2013-242872 A | 12/2013 |

OTHER PUBLICATIONS

The Extended European Search Report dated Nov. 15, 2016 for the related European Patent Application No. 14870504.9.
Jeremie: "QuickConnect, Quickly Explained", synology, Nov. 15, 2013 (Nov. 15, 2013), XP055171681, Retrieved from the Internet: URL:http://blog.synology.com/?p=2283 [retrieved on Feb. 24, 2015].

* cited by examiner

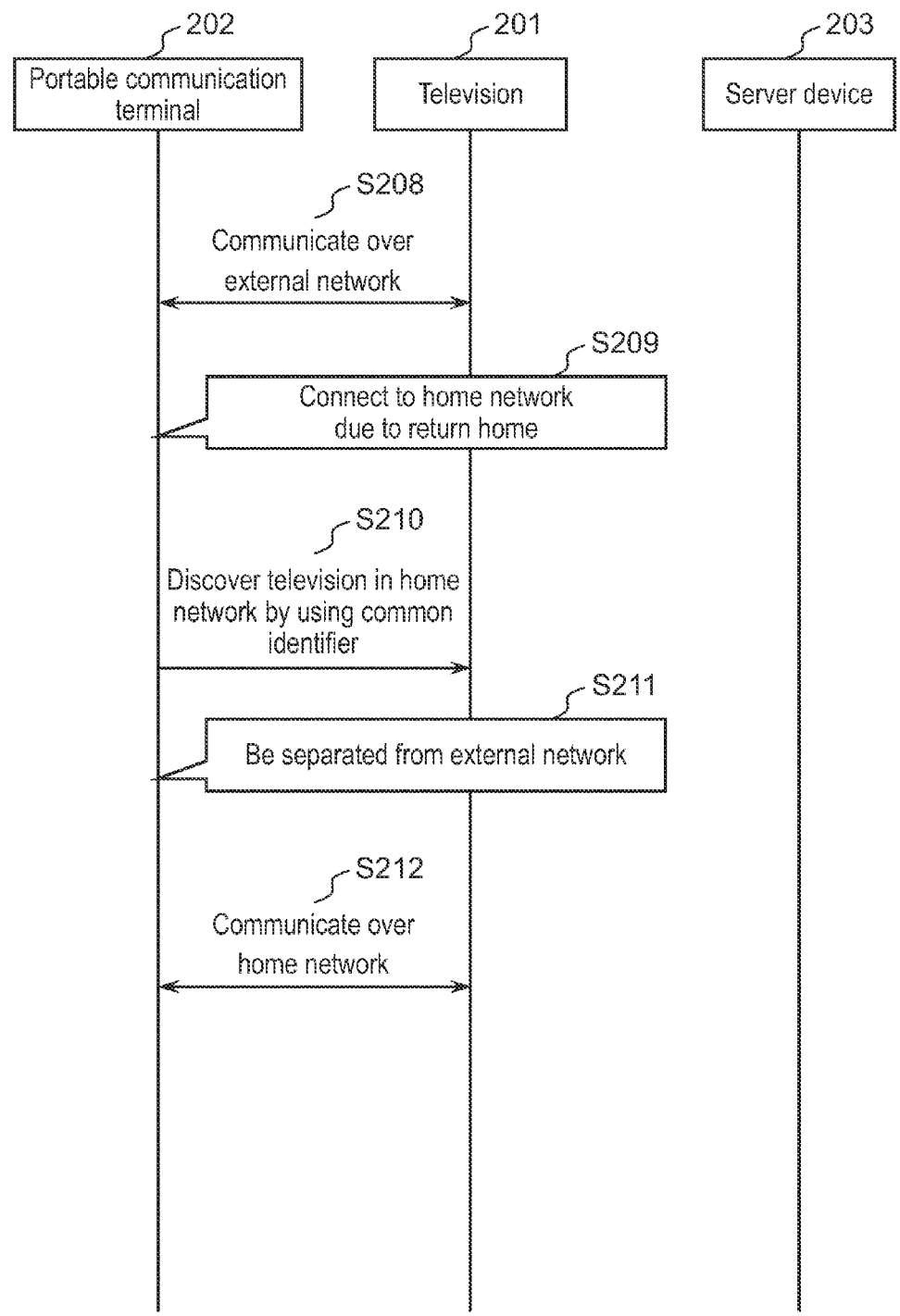

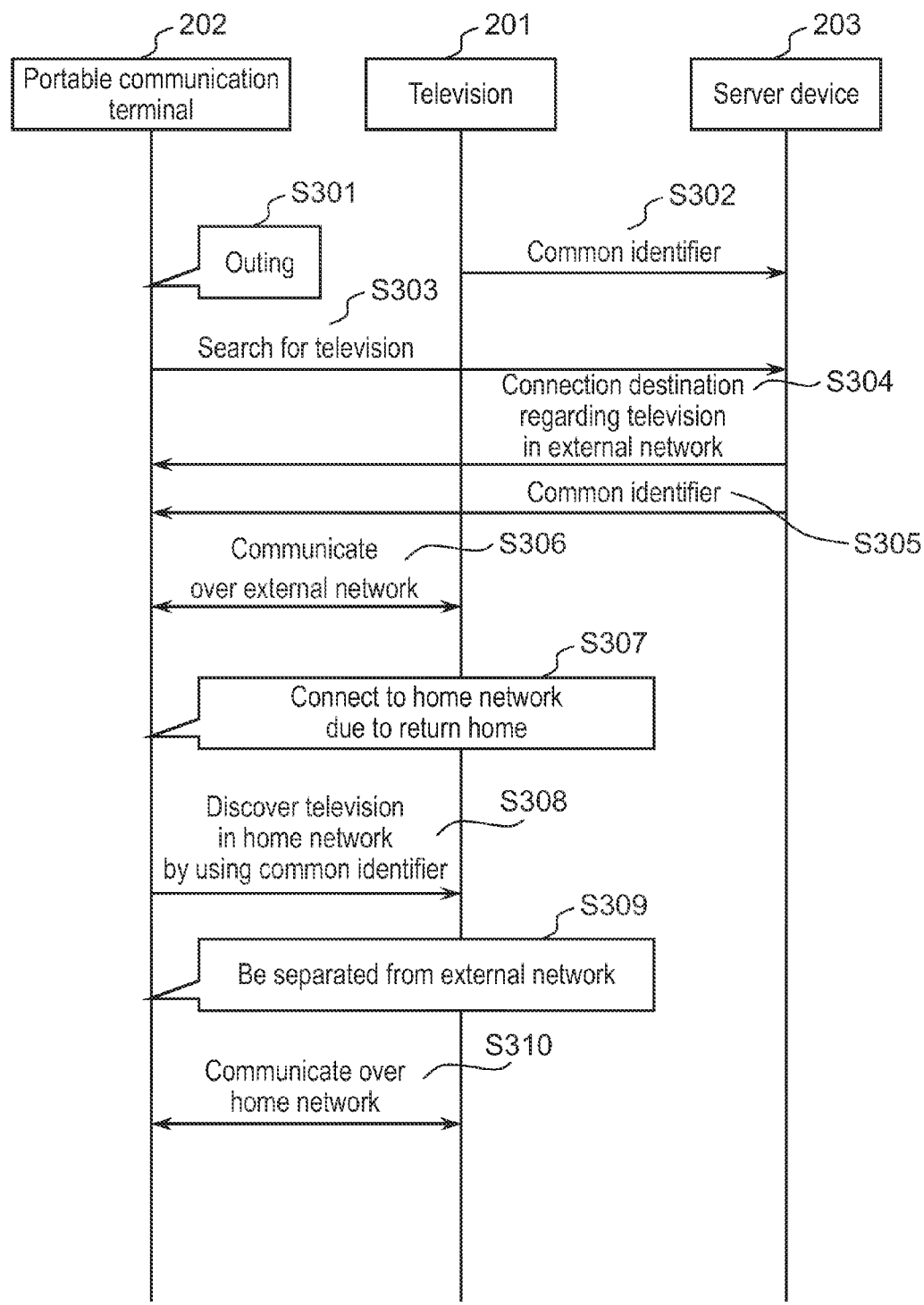

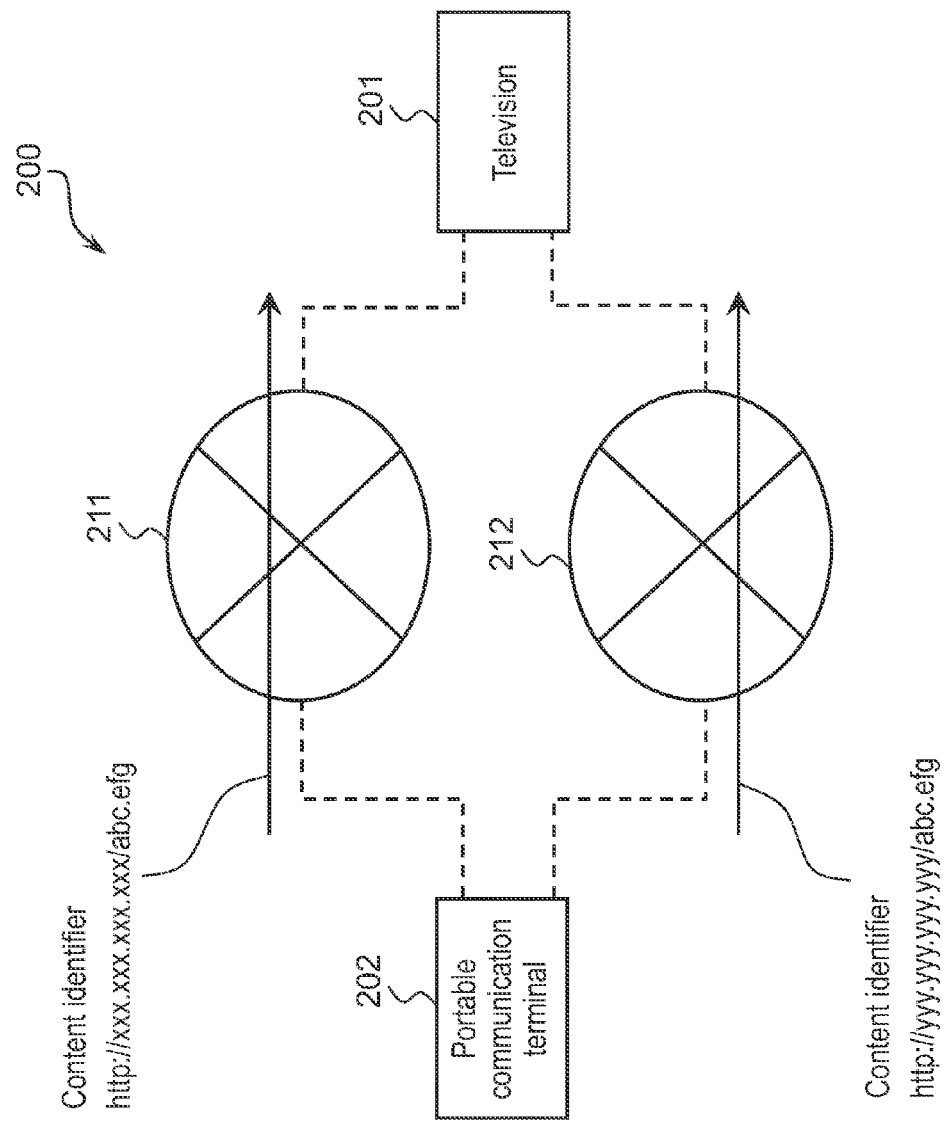

COMMUNICATION METHOD, SYSTEM, AND DEVICE

CROSS-REFERENCE TO RELATED APPLICATIONS

This application is a U.S. national stage application of the PCT International Application No. PCT/JP2014/006012 filed on Dec. 2, 2014, which claims the benefit of foreign priority of Japanese patent application 2013-256897 filed on Dec. 12, 2013, the contents all of which are incorporated herein by reference.

TECHNICAL FIELD

The present disclosure relates to a communication method for communicating between devices by selective use of a plurality of networks.

BACKGROUND ART

PTL 1 discloses a method for remotely accessing a device at home from a device outside home, and to remotely view and listen to content stored in the device at home. With this method, information in the device at home is provided to the device outside home only when a secure communication channel is established. Secure communication is thereby realized.

CITATION LIST

Patent Literature

PTL 1: Unexamined Japanese Patent Publication No. 2013-123143

SUMMARY

The present disclosure provides a communication method allowing appropriate communication between devices by selective use of a plurality of networks.

A communication method according to the present disclosure is a communication method for communicating between a first device and a second device over one of a first network and a second network. This communication method includes transmitting a common identifier from the first device to the second device over one of the first network and the second network, the common identifier being for uniquely specifying the first device, receiving the common identifier at the second device, and communicating between the first device and the second device over one of the first network and the second network. This common identifier is an identifier for uniquely specifying the first device in both the first network and the second network with different methods for specifying the first device. In the communicating, whether communication between the first device and the second device over the first network is possible is determined. When communication between the first device and the second device over the first network is determined to be possible, the first device is specified in the first network by using the received common identifier. Then, communication between the specified first device and the second device is performed over the first network. When communication between the first device and the second device over the first network is determined to be not possible, the first device is specified in the second network by using the received common identifier. Then, communication between the specified first device and the second device is performed over the second network.

A communication system according to the present disclosure is a communication system including a first device, and a second device for communicating with the first device over one of a first network and a second network. The first device transmits a common identifier for uniquely specifying the first device to the second device over one of the first network and the second network. This common identifier is an identifier for uniquely specifying the first device in both the first network and the second network with different methods for specifying the first device. The second device receives the common identifier. Also, the second device determines whether communication with the first device over the first network is possible. Then, when it is determined that communication with the first device over the first network is possible, the second device specifies the first device in the first network by using the received common identifier, and communicates with the specified first device over the first network. Also, when it is determined that communication with the first device over the first network is not possible, the second device specifies the first device in the second network by using the received common identifier, and communicates with the specified first device over the second network.

A communication device according to the present disclosure is a communication device for communicating with a counterpart device over one of a first network and a second network. This communication device includes a controller for transmitting a common identifier to the counterpart device over one of the first network and the second network, the common identifier being for uniquely specifying the communication device. This common identifier is an identifier for uniquely specifying the communication device in both the first network and the second network with different methods for specifying the communication device. When communication with the counterpart device over the first network is determined to be possible, the controller communicates with the counterpart device over the first network. This counterpart device is a device for specifying the communication device in the first network by using the common identifier. When communication with the counterpart device over the first network is determined to be not possible, the controller communicates with the counterpart device over the second network. This counterpart device is a device for specifying the communication device in the second network by using the common identifier.

A communication device according to the present disclosure is a communication device for communicating with a counterpart device over one of a first network and a second network. This communication device includes a controller for receiving a common identifier from the counterpart device over one of the first network and the second network, the common identifier being for uniquely specifying the counterpart device. This common identifier is an identifier for uniquely specifying the counterpart device in both the first network and the second network with different methods for specifying the counterpart device. The controller determines whether communication with the counterpart device over the first network is possible. Then, when communication with the counterpart device over the first network is determined to be possible, the controller specifies the counterpart device in the first network by using the received common identifier, and communicates with the specified counterpart device over the first network. When communication with the counterpart device over the first network is determined to be not possible, the controller specifies the counterpart device in the second network by using the received common identifier, and communicates with the specified counterpart device over the second network.

With the communication method according to the present disclosure, appropriate communication may be performed between devices by selective use of a plurality of networks.

BRIEF DESCRIPTION OF DRAWINGS

FIG. 7B is a sequence diagram showing the sequence of the first operation example of the communication system according to the second exemplary embodiment.

FIG. 8 is a sequence diagram showing a second operation example of the communication system according to the second exemplary embodiment.

FIG. 9 is a diagram showing an example of a content identifier according to the second exemplary embodiment.

DESCRIPTION OF EMBODIMENTS

Hereinafter, exemplary embodiments will be described in detail with reference to the drawings as appropriate. However, there are cases where unnecessarily detailed descriptions are omitted. For example, detailed descriptions on already well-known matters and overlapping explanations on substantially the same configurations may be omitted. This is to prevent the following descriptions from becoming unnecessarily redundant and to facilitate the understanding by a person skilled in the art.

Additionally, the appended drawings and the following descriptions are provided for a person skilled in the art to fully understand the present disclosure, and are not intended to limit the subject matter of the appended claims.

FIRST EXEMPLARY EMBODIMENT

In the following, a first exemplary embodiment will be described with reference to FIGS. 1 and 2.

(1-1. Configuration)

Figure 1:
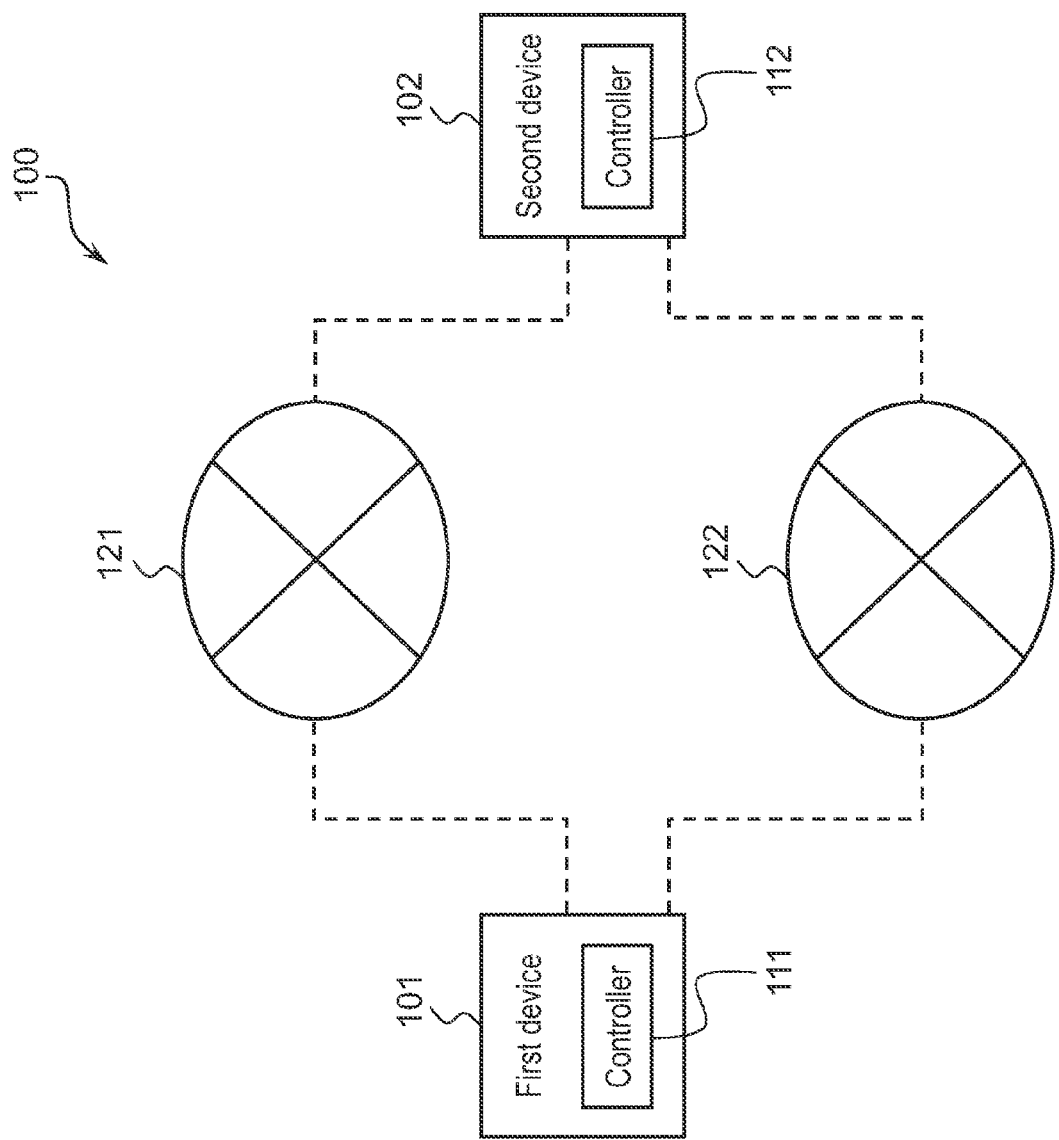
FIG. 1 is a block diagram showing a configuration example of a communication system according to a first exemplary embodiment.

FIG. 1 is a block diagram showing a configuration example of a communication system according to a first exemplary embodiment.

Communication system 100 includes first device 101 and second device 102. First device 101 and second device 102 are each connected to first network 121 and second network 122. First device 101 and second device 102 communicate with each other over one of first network 121 and second network 122.

First device 101 is a communication device capable of communication with another device over a network. Specifically, first device 101 communicates with second device 102 over first network 121 or second network 122. First device 101 is a television apparatus or a video recorder, for example.

First device 101 includes controller 111.

Controller 111 is a processor for controlling the operation of first device 101. The operation of first device 101 described below is performed mainly by controller 111. First device 101 may further include a storage unit, a communication interface, and the like. Moreover, controller 111 may communicate with second device 102 via the communication interface by using information stored in the storage unit.

Like first device 101, second device 102 is a communication device capable of communication with another device over a network. Specifically, second device 102 communicates with first device 101 over first network 121 or second network 122. Second device 102 is a portable communication terminal such as a mobile phone or a smartphone, for example.

Second device 102 includes controller 112.

Controller 112 is a processor for controlling the operation of second device 102. The operation of second device 102 described below is performed mainly by controller 112. Second device 102 may further include a storage unit, a communication interface, and the like. Moreover, controller 112 may communicate with first device 101 via the communication interface by using information stored in the storage unit.

First network 121 and second network 122 are physically different networks. A method for specifying each device at first network 121 and a method for specifying each device at second network 122 are different from each other. At first network 121, Universal Plug and Play (UPnP), which is a protocol for communication, is used for specifying each device, for example. Also, at second network 122, a server holding information of each device is used for specifying each device, for example. This server is an example of a third device.

First network 121 is more preferentially used for communication between first device 101 and second device 102 than second network 122. That is, if first device 101 and second device 102 are capable of communicating over first network 121, first network 121 is used for the communication. If first network 121 cannot be used for the communication between first device 101 and second device 102, second network 122 is used for the communication.

Furthermore, first network 121 is a home network, and second network 122 is an external network, for example. That is, first network 121 is a network limited to inside a home. On the other hand, second network 122 is not limited to inside a home. Additionally, "inside a home" means "inside one house", but it may also be used in the sense of "within a limited area".

Furthermore, first network 121 may be a network that is compatible with Wi-Fi (Wireless Fidelity), and second network 122 may be a network that is compatible with 3G network (3rd Generation network), for example. More specifically, first network 121 may use communication standards according to Wi-Fi, and second network 122 may use communication standards according to 3G network.

Additionally, Wi-Fi refers to a technology for wirelessly communicating between devices. For example, Wi-Fi uses IEEE802.11 standard as the communication standard. 3G network refers to a mobile telecommunications technology. Second network 122 may also be compatible with 4G network (4th Generation network), which is a next generation mobile telecommunications technology.

(1-2. Operation)

Operation of communication system 100 configured in the above manner will be described below.

In communication system 100, each processing for communication between devices by selective use of one network among a plurality of networks is performed. Each processing will be described in detail below.

Figure 2:
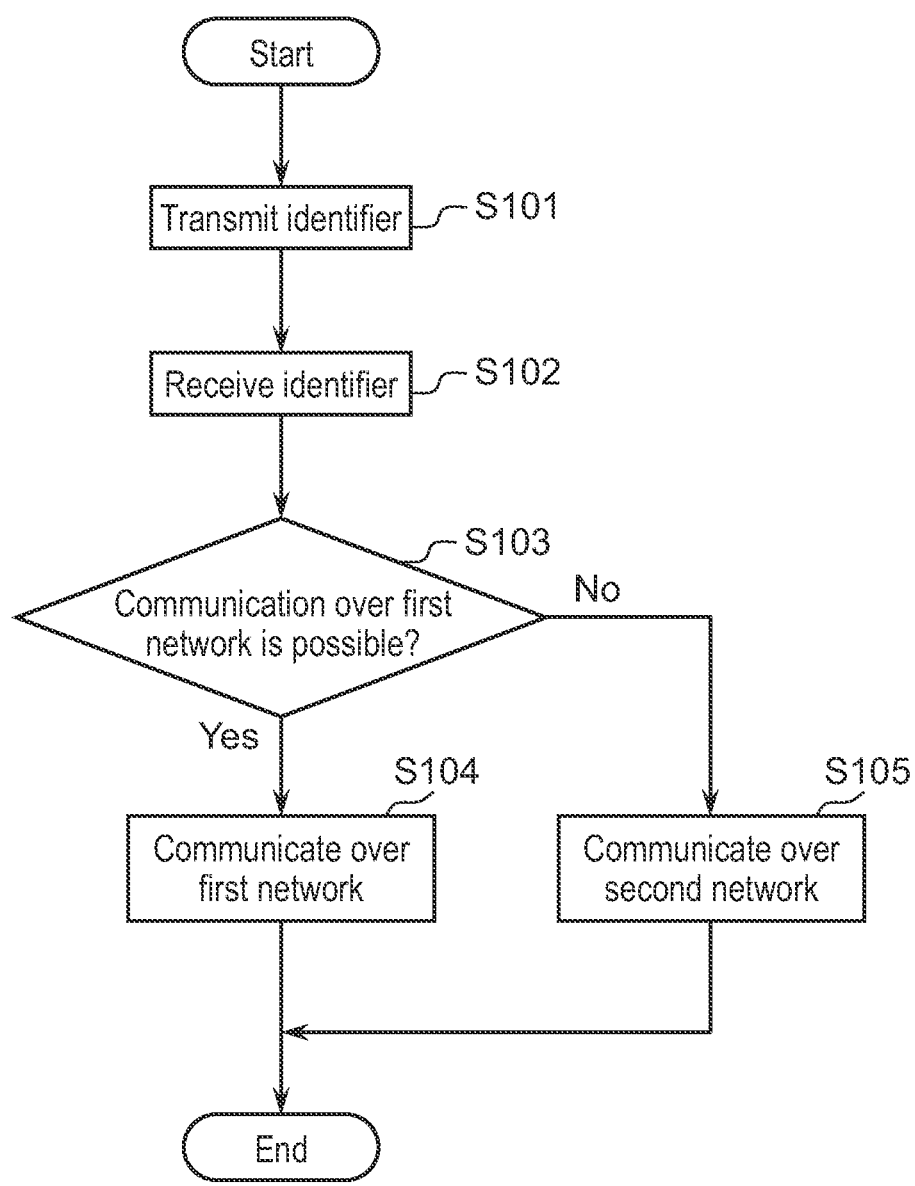
FIG. 2 is a flow chart showing an operation example of the communication system according to the first exemplary embodiment.

FIG. 2 is a flow chart showing an operation example of communication system 100 according to the first exemplary embodiment shown in FIG. 1. First device 101 and second device 102 perform communication in the following manner.

First, in communication system 100, first device 101 transmits an identifier to second device 102 over first network 121 or second network 122 (step S101). The identifier here is a common identifier. A common identifier is an identifier for uniquely specifying first device 101 in both first network 121 and second network 122 with different methods for specifying first device 101.

Next, in communication system 100, second device 102 receives the identifier (step S102). Second device 102 receives the identifier transmitted by first device 101 over first network 121 or second network 122.

Next, in communication system 100, it is determined whether communication between first device 101 and second device 102 over first network 121, which is prioritized over second network 122, is possible (step S103). Specifically, in communication system 100, it is determined whether second device 102 can communicate with first device 101 over first network 121.

An example of this determination is described. For example, second device 102 searches for first device 101 in first network 121 by using the common identifier. Then, if first device 101 is found in first network 121, second device 102 determines that communication with first device 101 over first network 121 is possible. On the other hand, if first device 101 is not found in first network 121, second device 102 determines that communication with first device 101 over first network 121 is not possible.

Another example of this determination is described below. For example, second device 102 may determine that communication with first device 101 over first network 121 is possible, if connection to first network 121 is detected. On the other hand, second device 102 may determine that communication with first device 101 over first network 121 is not possible, if separation of second device 102 from first network 121 is detected.

Moreover, second device 102 may determine that communication with first device 101 over first network 121 is possible, if connection to first network 121 is detected and first device 101 is found in first network 121, for example. On the other hand, second device 102 may determine that communication with first device 101 over first network 121 is not possible, if first device 101 is not found in first network 121 or if separation of second device 102 from first network 121 is detected.

As a result of determination in step S103, if it is determined that communication between first device 101 and second device 102 over first network 121 is possible (Yes), in communication system 100, first device 101 is specified in first network 121 by using the received identifier. Then, in communication system 100, communication between specified first device 101 and second device 102 is performed over first network 121 (step S104).

More specifically, when it is determined that communication with first device 101 over first network 121 is possible, second device 102 specifies first device 101 in first network 121 by using the received identifier. Then, second device 102 communicates with first device 101 over first network 121.

On the other hand, if, as a result of the determination in step S103, it is determined that communication between first device 101 and second device 102 over first network 121 is not possible (No), in communication system 100, first device 101 is specified in second network 122 by using the received identifier. Then, in communication system 100, communication between specified first device 101 and second device 102 is performed over second network 122 (step S105).

More specifically, when it is determined that communication with first device 101 over first network 121 is not possible, second device 102 specifies first device 101 in second network 122 by using the received identifier. Then, second device 102 communicates with first device 101 over second network 122.

Additionally, in the case where communication over first network 121 is determined in step S103 to be not possible (No), in communication system 100, it may be determined whether communication over second network 122 is possible. In communication system 100, it is possible to determine whether communication over second network 122 is possible in the same manner as the determination performed in step S103 of whether communication over first network 121 is possible. Then, if communication over second network 122 is possible, in communication system 100, communication may be performed over second network 122 (step S105).

Also, in communication system 100, it may be determined whether communication between first device 101 and second device 102 over first network 121 is possible during a period of time when communication is being performed between first device 101 and second device 102. Then, in communication system 100, the network to be used for communication between first device 101 and second device 102 may be switched from first network 121 to second network 122, or from second network 122 to first network 121.

Moreover, steps S103 to S105 shown in FIG. 2 may be regularly repeated, for example. Specifically, second device 102 may regularly repeat steps S103 to S105 shown in FIG. 2.

More specifically, if communication with first device 101 over first network 121 is disabled during a period of time when communication is being performed with first device 101 over first network 121, second device 102 starts communication with first device 101 over second network 122. Also, if communication with first device 101 over first network 121 is enabled during a period of time when communication is being performed with first device 101 over second network 122, second device 102 starts communication with first device 101 over first network 121.

(1-3. Effect and Others)

As described above, in the present exemplary embodiment, communication system 100 includes first device 101, and second device 102 for communicating with first device 101 over one of first network 121 and second network 122. First device 101 transmits a common identifier for specifying first device 101 to second device 102 over one of first network 121 and second network 122. The common identifier is an identifier for uniquely specifying first device 101 in both first network 121 and second network 122 with different methods for specifying first device 101. Second device 102 receives the common identifier.

Then, second device 102 determines whether communication with first device 101 over first network 121 is possible. When it is determined that communication with first device 101 over first network 121 is possible, second device 102 specifies first device 101 in first network 121 by using the received common identifier, and communicates with specified first device 101 over first network 121. On the other hand, when it is determined that communication with first device 101 over first network 121 is not possible, second device 102 specifies first device 101 in second network 122 by using the received common identifier, and communicates with specified first device 101 over second network 122.

Second device 102 can thus appropriately specify first device 101 by using the common identifier in both first network 121 and second network 122. Also, of first network 121 and second network 122, second device 102 can appropriately use prioritized first network 121. Accordingly, in communication system 100, communication between first device 101 and second device 102 is performed appropriately by selectively using first network 121 and second network 122.

Additionally, in communication system 100, transmission/reception of content may be performed by using a content identifier. For example, first device 101 may transmit a content identifier for specifying content to second device 102 over one of first network 121 and second network 122. Then, second device 102 may receive the content identifier transmitted by first device 101.

Then, if communication with first device 101 over first network 121 is possible, second device 102 may specify content via first network 121 by using the received content identifier and receive content over first network 121. On the other hand, if communication with first device 101 over first network 121 is not possible, second device 102 may specify content via second network 122 by using the received content identifier and receive content over second network 122.

Furthermore, second device 102 may partially change the content identifier based on over which of first network 121 and second network 122 the content is to be received. Specifically, second device 102 may change a part of the content identifier indicating the transmission source. Then, second device 102 may specify content by using the partially changed content identifier.

Thereby, in communication system 100, transmission/reception of content can be performed appropriately by using the content identifier.

SECOND EXEMPLARY EMBODIMENT

In the following, a second exemplary embodiment will be described with reference to FIGS. 3 to 9.

(2-1. Configuration)

Figure 3:
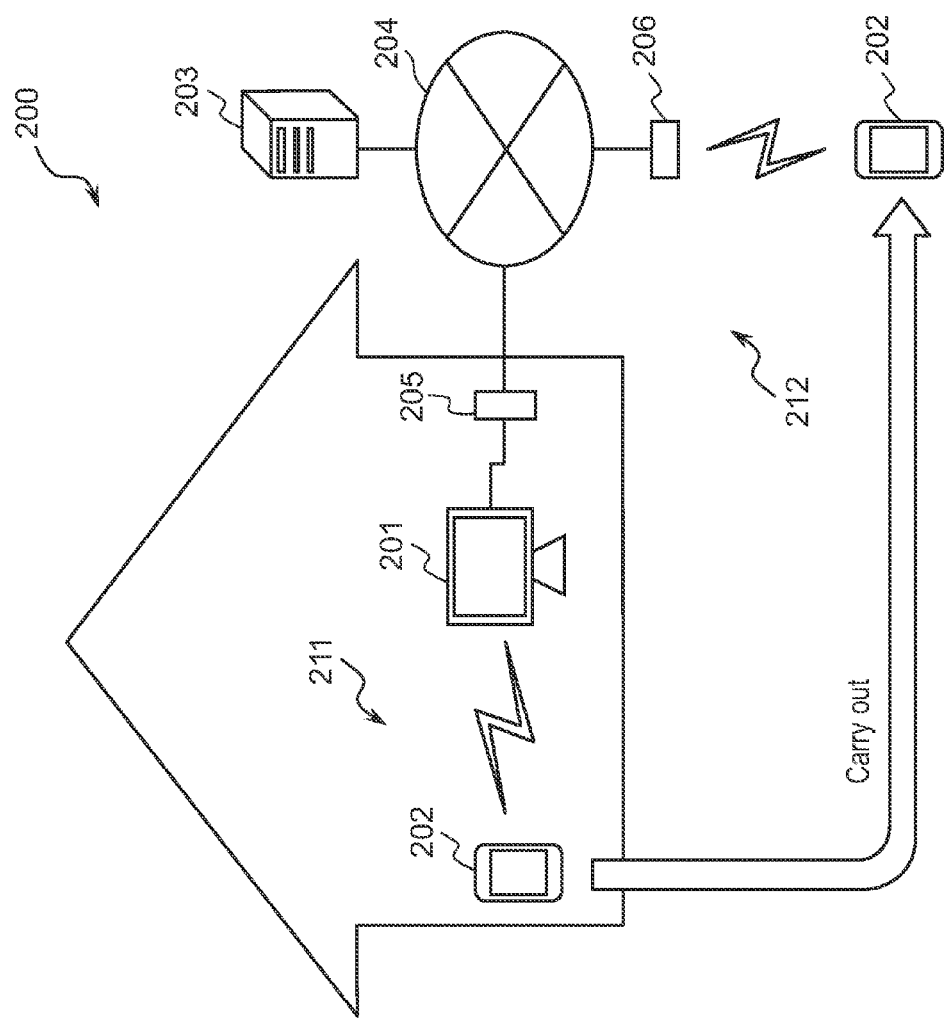
FIG. 3 is a conceptual diagram showing an example of a communication system according to a second exemplary embodiment.

FIG. 3 is a conceptual diagram showing an example of a communication system according to the second exemplary embodiment.

Communication system 200 includes television 201, portable communication terminal 202, and the like.

Television 201 and portable communication terminal 202 communicate with each other over one of first network 211 and second network 212. Second network 212 includes Internet 204, router 205, base station 206, and the like. Server device 203 is connected to second network 212.

Additionally, in the present exemplary embodiment, television 201 corresponds to first device 101 in the first exemplary embodiment, portable communication terminal 202 corresponds to second device 102 in the first exemplary embodiment, first network 211 corresponds to first network 121 in the first exemplary embodiment, and second network 212 corresponds to second network 122 in the first exemplary embodiment. Moreover, server device 203 is an example of a third device.

Television 201 is a device for displaying a video based on television broadcast, an input video signal or the like, and is a communication device capable of communicating with another device over a network. Specifically, television 201 can communicate with portable communication terminal 202 over first network 211 or second network 212. Also, television 201 includes functions of recording a video and reproducing a video, and is capable of transmitting content such as a video to portable communication terminal 202.

Like television 201, portable communication terminal 202 is a communication device capable of communicating with another device over a network, and is a portable device. Specifically, portable communication terminal 202 is capable of communicating with television 201 over first network 211 or second network 212. For example, portable communication terminal 202 is a mobile phone, a smartphone, a tablet terminal or the like.

When a user uses portable communication terminal 202 at home, portable communication terminal 202 can communicate with television 201 over first network 211. When the user uses portable communication terminal 202 outside home, portable communication terminal 202 can communicate with television 201 over second network 212.

Server device 203 is a computer for supporting Peer-to-Peer (hereinafter also referred to as "P2P") connection over the external network. For example, server device 203 is an STUN (Simple Traversal of UDP through NATs) server supporting P2P connection by using a method called STUN. In the external network, television 201 and portable communication terminal 202 communicate with each other through P2P connection.

Specifically, server device 203 receives a packet from television 201 via router 205 and Internet 204, and acquires connection destination information of television 201 in second network 212 based on the received packet. Then, server device 203 supports P2P connection between portable communication terminal 202 and television 201 by notifying portable communication terminal 202 of the connection destination information in response to a request from portable communication terminal 202.

Internet 204 is a network where a plurality of devices and a plurality of networks are interconnected. In the example in FIG. 3, server device 203, router 205, and base station 206 are connected to Internet 204.

More specifically, although not shown in FIG. 3, server device 203 and router 205 are each connected to Internet 204 through the network of an Internet service provider. Also, base station 206 is connected to Internet 204 through a mobile phone communication network. The mobile phone communication network may include base station 206, and a wireless communication network to base station 206.

Router 205 is a device for relaying data between networks. Specifically, router 205 is connected to television 201 and Internet 204, and transfers data from television 201 to Internet 204 and from Internet 204 to television 201.

Furthermore, router 205 is also a NAT (Network Address Translator) device including a NAT function. NAT refers to a mechanism of translating an IP (Internet Protocol) address.

For example, a local address is set to the IP address of television 201. Accordingly, television 201 cannot directly access Internet 204. Thus, router 205 translates the local address to a global address. Television 201 is thereby enabled to access Internet 204.

Furthermore, it is not easy for an external device to access television 201 having a local address set as the IP address. Accordingly, router 205 can reduce unauthorized accesses from Internet 204 to television 201.

Additionally, here, for the sake of simplicity, an example where router 205 includes the NAT function is described. However, the local address may be translated to a global address at the network of an Internet service provider or a device connected to the network.

Base station 206 is a facility for wirelessly transmitting or receiving data to or from portable communication terminal 202. Portable communication terminal 202 may be connected to Internet 204 via base station 206.

First network 211 is a home network. For example, first network 211 uses communication standards according to Wi-Fi. Also, Universal Plug and Play (hereinafter also referred to as "UPnP") is used for discovery (specification) of each device in first network 211. Specifically, each device is discovered by performing of multicast in first network 211.

Second network 212 is an external network. For example, second network 212 uses communication standards according to 3G network. Also, server device 203 is used for discovery (specification) of each device in second network 212.

Specifically, discovery (specification) of each device in second network 212 is performed in the following manner. For example, television 201 regularly transmits a packet indicating the identifier to server device 203. Server device 203 extracts the identifier of television 201 from the packet which has been transmitted, and holds the same. Portable communication terminal 202 accesses server device 203, and acquires the identifier of television 201. Portable communication terminal 202 thus discovers (specifies) television 201 via server device 203.

Figure 4:
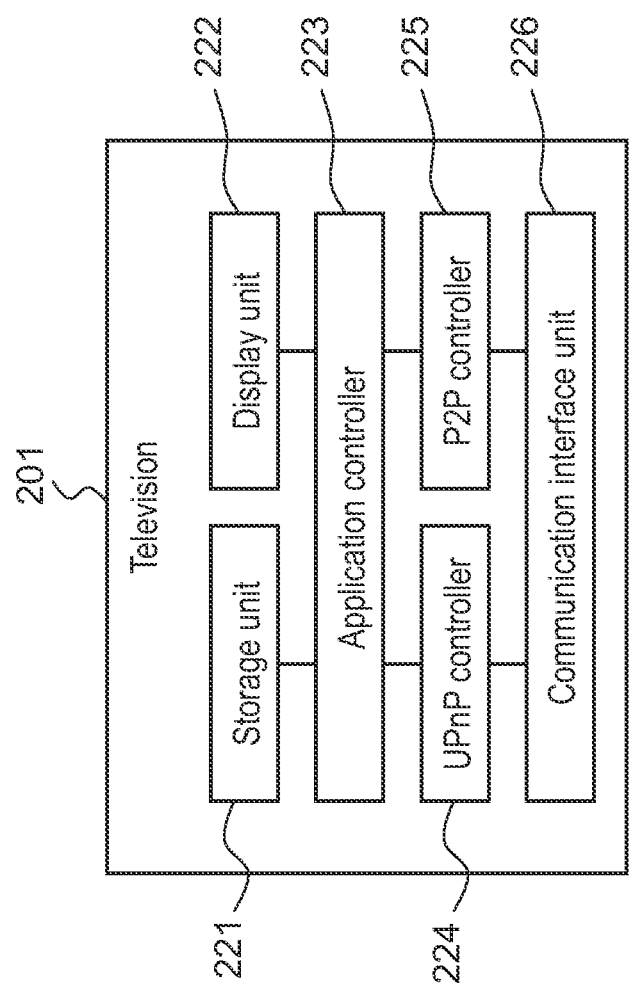
FIG. 4 is a block diagram showing a configuration example of a television according to the second exemplary embodiment.

FIG. 4 is a block diagram showing a configuration example of television 201 according to the second exemplary embodiment.

Television 201 includes storage unit 221, display unit 222, application controller 223, UPnP controller 224, P2P controller 225, and communication interface unit 226.

Storage unit 221 is a memory device for storing information, and is a semiconductor memory or a hard disk drive, for example. Video (content) which has been broadcast, an identifier for specifying television 201, application programs for recording and reproducing a video, and the like are stored in storage unit 221.

Display unit 222 is a display device for displaying a video or the like. Display unit 222 is a liquid crystal display, for example, but it may alternatively be an EL (Electro Luminescence) video display device. Display unit 222 displays videos which have been broadcast, videos input from outside, videos stored in storage unit 221, and the like. Display unit 222 may display a GUI for an application program for recording or reproducing a video.

Application controller 223 is a processor for executing various application programs. For example, application controller 223 executes an application program for recording or reproducing a video.

UPnP controller 224 is a processor for controlling communication based on Universal Plug and Play (UPnP). UPnP controller 224 performs communication based on UPnP, via communication interface unit 226. For example, UPnP controller 224 transmits data packets by multicast, and causes another device to detect itself (television 201). Also, UPnP controller 224 receives a data packet transmitted by another device by multicast, and detects the other device.

P2P controller 225 is a processor for controlling peer-to-peer (P2P) communication. In particular, P2P controller 225 controls P2P communication over second network 212 via communication interface unit 226. Specifically, P2P controller 225 uses the STUN technique.

For example, P2P controller 225 transmits a data packet to server device 203. Server device 203 acquires connection destination information of television 201 from the data packet which has been transmitted. The connection destination information includes a global address, a port number and the like for connecting to television 201. Portable communication terminal 202 acquires the connection destination information of television 201 from server device 203, and communicates with television 201 by P2P. P2P controller 225 thereby establishes communication with portable communication terminal 202.

Communication interface unit 226 is an interface unit for communicating with other devices. Communication interface unit 226 may include a plurality of interface devices. For example, communication interface unit 226 may include an interface device for connecting to a wireless network, and an interface device for connecting to a wired network. More specifically, communication interface unit 226 may include an antenna for wireless communication, and a connection terminal for wired communication.

Figure 5:
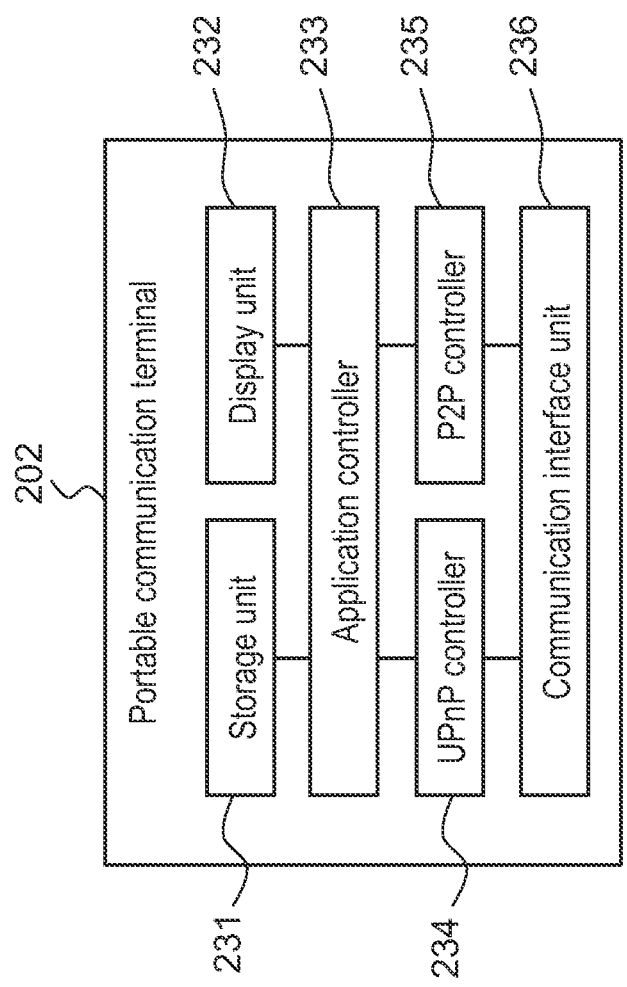
FIG. 5 is a block diagram showing a configuration example of a portable communication terminal according to the second exemplary embodiment.

FIG. 5 is a block diagram showing a configuration example of portable communication terminal 202 according to the second exemplary embodiment.

Portable communication terminal 202 includes storage unit 231, display unit 232, application controller 233, UPnP controller 234, P2P controller 235, and communication interface unit 236.

Storage unit 231 is a memory device for storing information, and is a semiconductor memory or a hard disk drive, for example. Video (content), an identifier for specifying television 201, an application program for reproducing a video, and the like are stored in storage unit 231. Application controller 233 may acquire these video, identifier, application program and the like from television 201, and store the same in storage unit 231.

Display unit 232 is a display device for displaying a video or the like. Display unit 232 is a liquid crystal display, for example, but it may alternatively be an EL video display device. Display unit 232 displays videos stored in storage unit 231, and the like. Display unit 232 may display a GUI (graphical use interface) of an application program for reproducing a video.

Application controller 233 is a processor for executing various application programs. For example, application controller 233 executes an application program for recording or reproducing a video.

UPnP controller 234 is a processor for controlling communication based on Universal Plug and Play (UPnP). UPnP controller 234 performs communication based on UPnP, via communication interface unit 236. For example, UPnP controller 234 transmits data packets by multicast, and causes another device to detect itself (portable communication terminal 202). Also, UPnP controller 234 receives a data packet transmitted by another device by multicast, and detects the other device.

P2P controller 235 is a processor for controlling peer-to-peer (P2P) communication. In particular, P2P controller 235 controls P2P communication over second network 212 via communication interface unit 236. Specifically, P2P controller 235 uses the STUN technique.

For example, P2P controller 235 specifies television 201 via server device 203. That is, P2P controller 235 acquires connection destination information of television 201 from server device 203. The connection destination information includes a global address, a port number and the like for connecting to television 201. P2P controller 235 communicates with television 201 by P2P by using the connection destination information to television 201. P2P controller 235 thereby establishes communication with television 201.

Communication interface unit 236 is an interface unit for communicating with other devices, and more specifically, it is a connection terminal for connecting to a network. Communication interface unit 236 may include a plurality of interface devices. For example, communication interface unit 236 may include an interface device for wireless communication, and an interface device for wired communication.

Television 201 shown in FIG. 4 and portable communication terminal 202 shown in FIG. 5 may each further include unique structural elements. For example, television 201 may include an antenna for receiving airwaves, or an infrared communication unit for receiving an operation signal from a remote control. Portable communication terminal 202 may include a microphone (an audio input unit) for a telephone call, a touch panel for inputting user's instruction data, and the like.

(2-2. Operation)

Operation of communication system 200 configured in the above manner will be described below.

Communication system 200 performs each processing for performing communication by selective use of a plurality of networks. Each processing will be described in detail below. First, an outline of operation of communication system 200 will be described with reference to FIG. 6.

Figure 6:
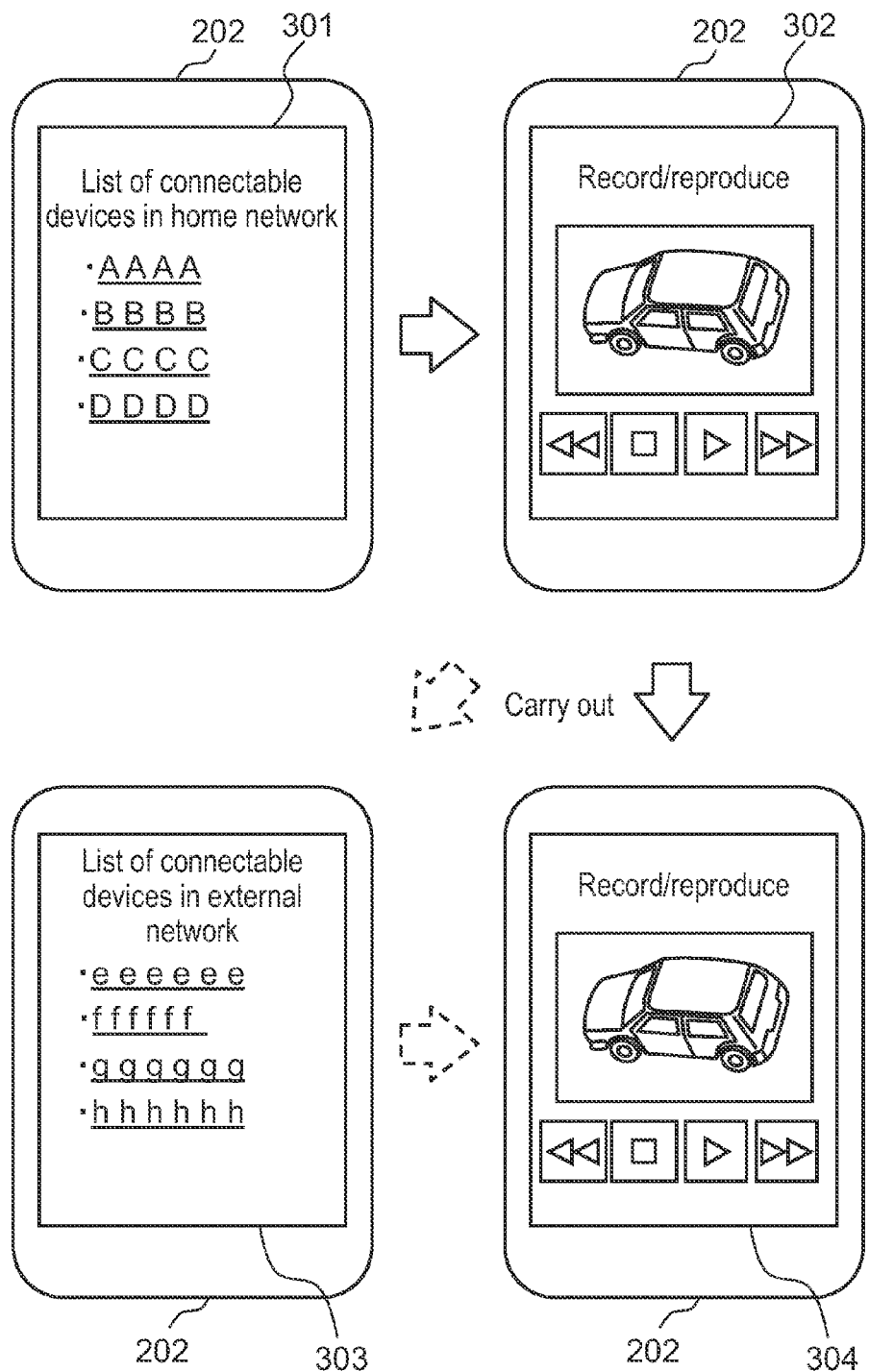
FIG. 6 is a diagram showing examples of a screen image of the portable communication terminal according to the second exemplary embodiment.

FIG. 6 is a diagram showing examples of a screen image of portable communication terminal 202 according to the second exemplary embodiment.

First, at the home network (first network 211), screen image 301 showing a list of devices to which connection over the home network is possible is displayed on a screen of display unit 232 of portable communication terminal 202 (in the following, the screen of display unit 232 will be referred to simply as "screen"). This list shows one or a plurality of devices detected based on Universal Plug and Play (UPnP).

For example, when a user selects television 201 from the list on screen image 301, portable communication terminal 202 starts communication with television 201. Then, portable communication terminal 202 may acquire an application program for recording or reproducing a video (content) from television 201 by this communication, and execute the acquired application program. Also, portable communication terminal 202 may acquire a video from television 201 based on this communication, and display the acquired video on the screen in the manner of screen image 302 in FIG. 6.

The user may possibly carry portable communication terminal 202 out of home when portable communication terminal 202 is displaying a video acquired from television 201 (for example, screen image 302) in the home network.

The method for specifying television 201 is different between the home network (first network 211) and the external network (second network 212). In the home network, portable communication terminal 202 specifies television 201 by UPnP, for example. On the other hand, in the external network, portable communication terminal 202 specifies television 201 via server device 203, for example. Accordingly, in the case of performing communication with television 201 after being carried out of home from inside home, portable communication terminal 202 has to specify television 201 by server device 203 again.

For example, when portable communication terminal 202 is carried out of home from inside home, screen image 303 showing a list of devices to which connection over the external network is possible is displayed on the screen of portable communication terminal 202. This list includes a device which has transmitted a packet from inside home to server device 203 over the external network. When the user selects television 201 from the list in screen image 303, portable communication terminal 202 starts communication with television 201.

Then, in the external network, as in the home network, portable communication terminal 202 can acquire a video from television 201 by this communication, and display the acquired video on the screen in the manner of screen image 304 in FIG. 6.

However, the method for specifying television 201 is different between the home network and the external network, and thus it is difficult to specify, from outside home, television 201 with which communication has been performed at home. Also, a video being displayed may be interrupted by a manual operation of the user of selecting television 201.

Accordingly, in communication system 200 according to the present exemplary embodiment, the same unique identifier (common identifier) in both the home network and the external network is assigned to television 201. More specifically, for example, the common identifier is an identifier for uniquely specifying television 201, and is used commonly in both UPnP in the home network and P2P connection in the external network.

Portable communication terminal 202 may thus easily specify same television 201 in both the home network and the external network. Furthermore, portable communication terminal 202 may easily continue displaying, in the external network, the video that has been displayed in the home network, or may easily restart reproduction of the video.

In the following, a specific operation of communication system 200 will be described with reference to FIGS. 7A, 7B and 8.

Figure 7A:
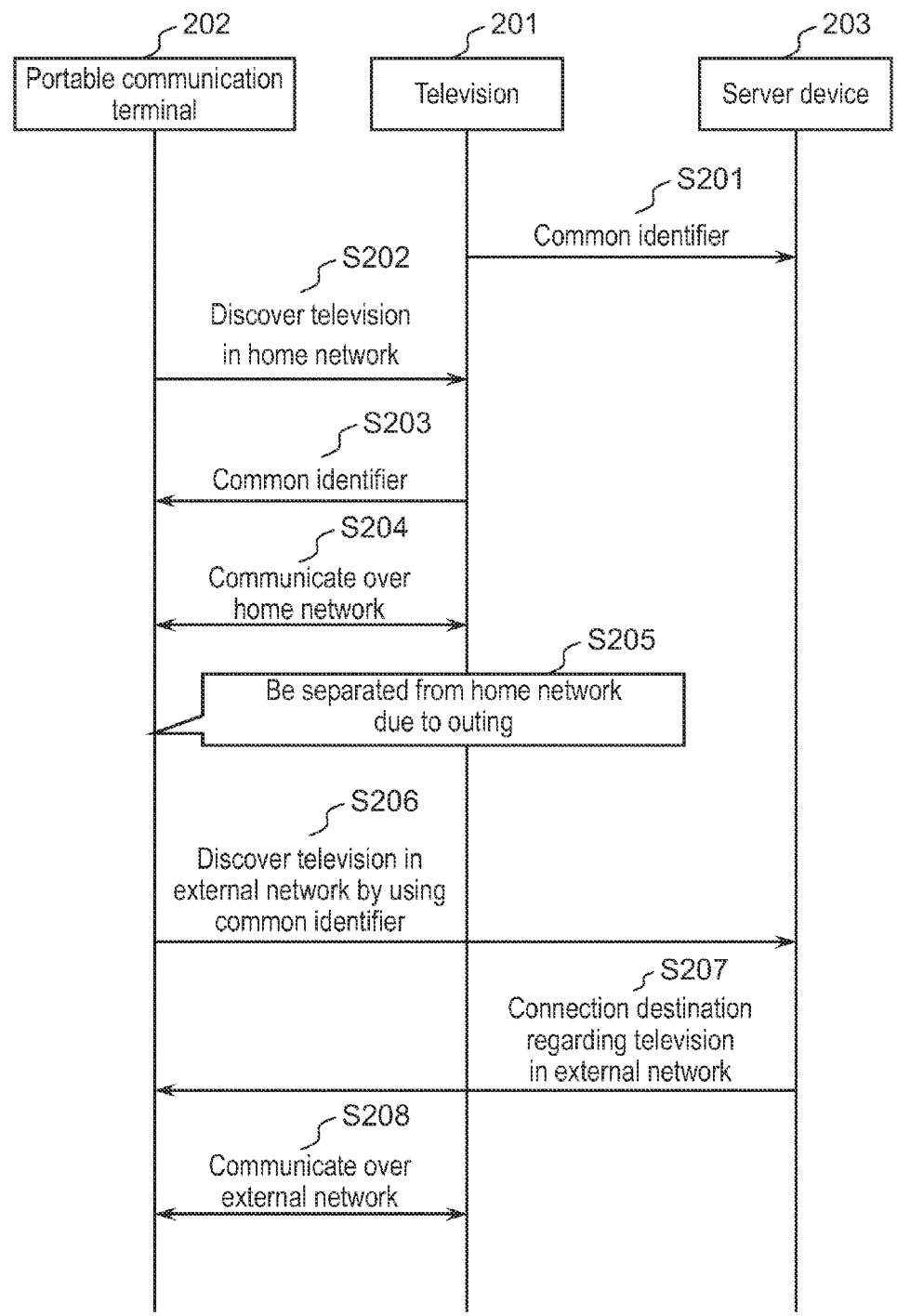
FIG. 7A is a sequence diagram showing a first operation example of the communication system according to the second exemplary embodiment.

FIG. 7A is a sequence diagram showing a first operation example of communication system 200 according to the second exemplary embodiment, and FIG. 7B is a sequence diagram showing the sequence of the first operation example of communication system 200 according to the second exemplary embodiment. FIG. 7A shows an operation example of communication system 200 for a case where a user uses portable communication terminal 202 at home, and then goes out carrying portable communication terminal 202. FIG. 7B shows an operation example of communication system 200 for a case where the user then comes home with portable communication terminal 202.

As shown in FIG. 7A, television 201 notifies server device 203 of the common identifier of television 201 in advance (step S201). The common identifier notified to server device 203 is held by server device 203.

Portable communication terminal 202 discovers television 201 in the home network by using UPnP (step S202).

Television 201 notifies portable communication terminal 202 of the common identifier over the home network by UPnP (step S203).

Portable communication terminal 202 communicates with television 201 by using this common identifier over the home network (step S204).

When the user goes out carrying portable communication terminal 202, portable communication terminal 202 is separated from the home network (step S205). At this time, portable communication terminal 202 determines that communication with television 201 over the home network is not possible.

Specifically, for example, when it is detected that Wi-Fi communication has been disabled, portable communication terminal 202 may determine that communication with television 201 over the home network is not possible. Or portable communication terminal 202 may determine that communication with television 201 is not possible when television 201 cannot be detected by UPnP.

Portable communication terminal 202 discovers television 201 in the external network by using the common identifier notified in step S203 (step S206). Specifically, portable communication terminal 202 detects television 201 via server device 203 by inquiring of server device 203 about television 201 that is specified by the common identifier notified in step S203.

Server device 203 notifies portable communication terminal 202 of the connection destination information to television 201 in the external network (step S207).

Portable communication terminal 202 communicates with television 201 over the external network by using the notified connection destination information (step S208).

Sequence of the operation is shown in FIG. 7B. When the user comes home carrying portable communication terminal 202 while portable communication terminal 202 is communicating with television 201 over the external network in step S208, portable communication terminal 202 connects to the home network (step S209). At this time, portable communication terminal 202 determines that communication with television 201 over the home network is possible.

Specifically, portable communication terminal 202 may determine that communication with television 201 over the home network is possible when it is detected that Wi-Fi communication has been enabled, for example. Or portable communication terminal 202 may determine that communication with television 201 is possible when television 201 is detected by using the common identifier by UPnP.

Portable communication terminal 202 discovers television 201 by using the common identifier by UPnP in the home network (step S210). This process in step S210 may be performed in the process described above of portable communication terminal 202 determining that communication with television 201 over the home network is possible.

Portable communication terminal 202 is separated from the external network (step S211).

Portable communication terminal 202 communicates with television 201 discovered in step S210 over the home network (step S212).

FIG. 8 is a sequence diagram showing a second operation example of communication system 200 according to the second exemplary embodiment. FIG. 8 shows operation of communication system 200 at the time of a user coming home with portable communication terminal 202 after using portable communication terminal 202 outside home. That is, FIG. 8 shows an operation example where portable communication terminal 202 first communicates with television 201 over the external network.

The user goes out carrying portable communication terminal 202 (step S301).

Television 201 notifies server device 203 of the common identifier of television 201 in advance (step S302).

Portable communication terminal 202 searches for television 201 via server device 203 (step S303). Specifically, for example, portable communication terminal 202 accesses server device 203, and displays a list of devices to which connection over the external network is possible in the manner of screen image 303 in FIG. 6. Then, television 201 is discovered by being selected by the user from the list.

Server device 203 notifies portable communication terminal 202 of the connection destination information to television 201 in the home network (step S304).

Also, server device 203 notifies portable communication terminal 202 of the common identifier of television 201 which has been notified to server device 203 in step S302 (step S305).

Portable communication terminal 202 communicates with television 201 over the external network by using the notified connection destination information (step S306).

When the user comes home carrying portable communication terminal 202 while portable communication terminal 202 is communicating with television 201 over the external network, portable communication terminal 202 connects to the home network (step S307). At this time, portable communication terminal 202 determines that communication with television 201 over the home network is possible.

Portable communication terminal 202 discovers television 201 by using the common identifier by UPnP in the home network (step S308). This process in step S308 may be performed in the process described above of portable communication terminal 202 determining that communication with television 201 over the home network is possible.

Portable communication terminal 202 is separated from the external network (step S309).

Portable communication terminal 202 communicates with television 201 discovered in step S308 over the home network (step S310).

By the operation described above, in communication system 200, communication by selectively using a plurality of networks can be appropriately performed. Also, portable communication terminal 202 can establish connection to television 201 over first network 211 or second network 212, and acquire a video (content) from television 201.

For example, at the time of acquiring content, portable communication terminal 202 may first acquire, over first network 211 or second network 212, a content identifier for specifying the content. Then, portable communication terminal 202 may specify the acquisition target content by using the content identifier, and acquire the specified acquisition target content.

Portable communication terminal 202 can appropriately specify content by using the content identifier both when acquiring content over first network 211 and when acquiring content over second network 212. Moreover, portable communication terminal 202 can seamlessly switch between first network 211 and second network 212.

Portable communication terminal 202 may partially change the content identifier depending on whether content is to be acquired over first network 211 or over second network 212. Then, portable communication terminal 202 may specify content by using the partially changed content identifier, and acquire the specified content.

For example, if the content identifier is an URL (Uniform Resource Locator), portable communication terminal 202 may change the IP address included in the URL depending on the network. Additionally, the IP address included in the URL may be represented by an FQDN (Full Qualified Domain Name) or a host name.

FIG. 9 is a diagram showing an example of the content identifier according to the second exemplary embodiment.

For example, as shown in FIG. 9, the content identifier may be represented by an URL. Portable communication terminal 202 acquires content specified by the URL from television 201. At this time, the URL for specifying the content may be different between first network 211 and second network 212.

When portable communication terminal 202 accesses television 201 over first network 211, which is the home network, portable communication terminal 202 accesses television 201 by using the local address assigned to television 201. On the hand, when portable communication terminal 202 accesses television 201 over second network 212, which is the external network, portable communication terminal 202 accesses television 201 by using the global address assigned to television 201.

In this manner, the IP address for accessing television 201 is different between first network 211 and second network 212. In such a case, the IP address included in the URL for specifying content is different between first network 211 and second network 212. Accordingly, portable communication terminal 202 changes the IP address included in the URL depending on whether content is to be acquired over first network 211 or over second network 212.

For example, in the example shown in FIG. 9, portable communication terminal 202 uses "http://xxx.xxx.xxx.xxx/abc.efg" as the content identifier when communication with television 201 is performed over first network 211. On the other hand, portable communication terminal 202 uses "http://yyy.yyy.yyy.yyy/abc.efg" as the content identifier when communication with television 201 is performed over second network 212.

In this manner, portable communication terminal 202 may change the IP address included in the content identifier. Portable communication terminal 202 may thereby appropriately specify content via first network 211 or second network 212.

(2-3. Effect and Others)

As described above, in the present exemplary embodiment, communication system 200 includes television 201, portable communication terminal 202, and the like. Television 201 transmits a common identifier to portable communication terminal 202 over one of the home network and the external network, and portable communication terminal 202 receives the common identifier. The common identifier is an identifier for specifying television 201 which is used in both the home network and the external network.

Then, if communication with television 201 over the home network is possible, portable communication terminal 202 specifies television 201 in the home network by using the common identifier, and communicates with television 201 over the home network. On the other hand, if communication with television 201 over the home network is not possible, portable communication terminal 202 specifies television 201 in the external network by using the common identifier, and communicates with television 201 over the external network.

Portable communication terminal 202 can thus appropriately specify television 201 by using the common identifier in both the home network and the external network. Also, portable communication terminal 202 can preferentially use the home network to the external network. Accordingly, portable communication terminal 202 and television 201 in communication system 200 may appropriately communicate with each other by selective use of the home network or the external network.

OTHER EXEMPLARY EMBODIMENTS

The first and the second exemplary embodiments have been described above as examples of the technique disclosed in the present application. However, the technique of the present disclosure is not limited to the above, and may also be applied to exemplary embodiments where changes, replacements, additions, omissions and the like are made. Also, a new exemplary embodiment may be obtained by combining structural elements described in the first and the second exemplary embodiments.

Accordingly, examples of other exemplary embodiments will be described below.

In the first and the second exemplary embodiments, first device 101, second device 102, television 201, portable communication terminal 202, and the like have been described as examples of communication devices (first device and second device). It is enough if the communication devices are able to communicate with another communication device. Accordingly, the communication devices are not limited to first device 101, second device 102, television 201, portable communication terminal 202, and the like.

Also, in the first and the second exemplary embodiments, controllers 111 and 112, application controllers 223 and 233, UPnP controllers 224 and 234, P2P controllers 225 and 235, and the like have been described as examples of controllers. It is enough if the controllers are capable of controlling the device. Accordingly, the controllers are not limited to controllers 111 and 112, application controllers 223 and 233, UPnP controllers 224 and 234, P2P controllers 225 and 235, and the like.

Furthermore, in the first and the second exemplary embodiments, first networks 121 and 211, second networks 122 and 212, and the like have been described as examples of networks (first network and second network). It is enough if the networks are capable of connecting a plurality of devices or the like in a manner allowing communication. Accordingly, the networks are not limited to first networks 121 and 211, second networks 122 and 212, and the like.

For example, the first network may be a home network, and the second network may be an external network. The first network may alternatively be a private network (a local network) public access to which is more restricted than the second network. Also, the second network may alternatively be a public network (a global network) for which restrictions on public access are reduced than for the first network. The first network may alternatively be a local area network, and the second network may alternatively be the Internet.

Furthermore, in the first and the second exemplary embodiments, the first network is determined to be prioritized over the second network. However, such a priority does not have to be set. That is, the first network does not have to be given priority over the second network.

Moreover, the first network and the second network may be physically different. For example, the first network and the second network may be entirely or partially different. The first network and the second network may alternatively include common parts.

Moreover, for example, the communication speed may be different between the first network and the second network. Specifically, the communication speed of the first network, which is given priority over the second network, may be faster than the communication speed of the second network. The bandwidth of the first network may be greater than the bandwidth of the second network.

Furthermore, for example, the first network and the second network may use different communication standards (communication protocols) from each other. Communication standards that can be used include communication standards according to Wi-Fi, 3G network, 4G network, BLUETOOTH (registered trademark), NFC (Near Field Communication), and the like. More specifically, the first network may be compatible with Wi-Fi, BLUETOOTH (registered trademark), NFC, or the like, and the second network may be compatible with 3G network, 4G network, or the like.

Furthermore, for example, the method for specifying a communication device may be different between the first network and the second network. Specifying a communication device here corresponds to discovery, detection or identification of the communication device. That is, the expression "specify" may be replaced by the expression "discover", "detect" or "identify". To specify a communication device, UPnP may be used, or a method for P2P connection may be used, or other methods may be used.

Moreover, for example, the common identifier for specifying a communication device in both the first network and the second network may be an identifier that is different from an UUID (Universally Unique IDentifier), which is set as the identifier of a communication device in UPnP. Such a common identifier may be transmitted together with an UUID. Also, the common identifier may be an identifier which is set as the identifier of a communication device by the method for P2P connection. Moreover, the common identifier may be an UUID. With the common identifier being used together with an existing identifier of each method, influence on an existing system is reduced.

Moreover, for example, the second device may search for the first device by using the UPnP and the common identifier when detecting connection to a Wi-Fi network having the same SSID (Service Set Identifier) as the first network which is a Wi-Fi network. The second device may thereby appropriately determine whether communication with the first device over the first network is possible.

Moreover, for example, the second device may determine that communication with the first device over the first network is not possible at a time point when reproduction of a video (content) acquired from the first device over the first network is disabled. Even when communication with the first device over the first network is not possible, the second device may possibly continue reproducing a video that is already acquired. To reduce unnecessary switching, the second device may perform switching between the first network and the second network after reproduction of a video is disabled.

Furthermore, for example, the first device may be a game console. Also, the second device may execute a game application of the first device over the first network or the second network.

Moreover, for example, a process to be performed by a specific structural element included in the communication system may be performed by another structural element. Also, the order of processes may be changed, or a plurality of processes may be performed in parallel.

Furthermore, the configuration according to the present disclosure may be realized not only as a communication system and a communication device, but also as a communication method including processes to be executed by a communication system or a communication device. For example, this method is performed by a computer (more specifically, a processor of a computer). Also, the configuration according to the present disclosure may be realized as a program for causing a computer to perform the method. Moreover, the configuration according to the present disclosure may be realized as a non-transitory computer-readable recording medium, such as a CD-ROM, in which the program is recorded.

Moreover, the communication device may be an electronic circuit such as an integrated circuit. A plurality of structural elements included in the communication device may be one circuit as a whole, or may be separate circuits. Also, these structural elements may each be a general-purpose circuit or a dedicated circuit.

Furthermore, the communication device may include a memory and a processor corresponding to structural elements described in the first and the second exemplary embodiments. Moreover, the processor may perform the processes described in the first and the second exemplary embodiments by using the memory.

Exemplary embodiments have been described above as examples of the technique of the present disclosure. The appended drawings and the detailed description are provided for this purpose.

Accordingly, in the structural elements described in the appended drawings and the detailed description, not only structural elements indispensable to solving the problems, but also structural elements not indispensable to solving the problems may be included in order to exemplify the above technique. It should therefore not be construed that those structural elements not indispensable are indispensable just because those structural elements not indispensable are described in the appended drawings and the detailed description.

Additionally, since the above-described exemplary embodiments are intended to exemplify the technique of the present disclosure, various changes, replacements, additions, omissions, etc., may be made within the literal and equivalent scope of the claims.

INDUSTRIAL APPLICABILITY

The present disclosure may be applied to a communication method for appropriately communicating between devices by selectively using a plurality of networks. Specifically, the present disclosure may be applied to a television, a smartphone, a portable communication terminal, a mobile phone, a video recorder, a game console, a communication system including the above, and the like.

REFERENCE MARKS IN THE DRAWINGS 100, 200 communication system
101 first device
102 second device
111, 112 controller
121, 211 first network
122, 212 second network
201 television
202 portable communication terminal
203 server device
204 Internet
205 router
206 base station
221, 231 storage unit
222, 232 display unit
223, 233 application controller 224, 234 UPnP controller
225, 235 P2P controller
226, 236 communication interface unit
301, 302, 303, 304 screen image

The invention claimed is:

1. A communication method for communicating between a first device and a second device over one of a first network and a second network, the communication method comprising:
  transmitting a common identifier from the first device to the second device over one of the first network and the second network, the common identifier being for uniquely specifying the first device in both the first network and the second network with different methods for specifying the first device;
  receiving the common identifier at the second device; and
  communicating between the first device and the second device over one of the first network and the second network,
  wherein in the communicating,
    whether communication between the first device and the second device over the first network is possible is determined,
    when communication between the first device and the second device over the first network is determined to be possible, the first device is specified in the first network by using the received common identifier, and communication between the specified first device and the second device is performed over the first network, and
    when communication between the first device and the second device over the first network is determined to be not possible, the first device is specified in the second network by using the received common identifier, and communication between the specified first device and the second device is performed over the second network,
  wherein in the transmitting, a content identifier for specifying content is further transmitted from the first device to the second device over one of the first network and the second network,
  wherein in the receiving, the content identifier is further received at the second device, and
  wherein in the communicating,
    when communication between the first device and the second device over the first network is determined to be possible, the content is specified via the first network by using the received content identifier, and the specified content is received at the second device over the first network, and
    when communication between the first device and the second device over the first network is determined to be not possible, the content is specified via the second network by using the received content identifier, and the specified content is received at the second device over the second network.

2. The communication method according to claim 1, wherein in the communicating,
  the first device is searched for in the first network by using the common identifier, and
  if the first device is found in the first network, communication between the first device and the second device over the first network is determined to be possible, and
  if the first device is not found in the first network, communication between the first device and the second device over the first network is determined to be not possible.

3. The communication method according to claim 1, wherein in the communicating,
  if connection of the second device to the first network is detected, communication between the first device and the second device over the first network is determined to be possible, and
  if separation of the second device from the first network is detected, communication between the first device and the second device over the first network is determined to be not possible.

4. The communication method according to claim 1, wherein in the communicating,
  whether communication between the first device and the second device over the first network is possible is determined during a period of time when communication is being performed between the first device and the second device, and
  a network to be used for communication between the first device and the second device is switched from the first network to the second network, or from the second network to the first network.

5. A communication method for communicating between a first device and a second device over one of a first network and a second network, the communication method comprising:
  transmitting a common identifier from the first device to the second device over one of the first network and the second network, the common identifier being for uniquely specifying the first device in both the first network and the second network with different methods for specifying the first device;
  receiving the common identifier at the second device; and
  communicating between the first device and the second device over one of the first network and the second network,
  wherein in the communicating,
    whether communication between the first device and the second device over the first network is possible is determined,
    when communication between the first device and the second device over the first network is determined to be possible, the first device is specified in the first network by using the received common identifier, and communication between the specified first device and the second device is performed over the first network, and
    when communication between the first device and the second device over the first network is determined to be not possible, the first device is specified in the second network by using the received common identifier, and communication between the specified first device and the second device is performed over the second network,
  wherein in the transmitting, a content identifier for specifying content is further transmitted from the first device to the second device over one of the first network and the second network,
  wherein in the receiving, the content identifier is further received at the second device, and
  wherein in the communicating,
    when communication between the first device and the second device over the first network is determined to be possible, the content is specified via the first network by using the received content identifier, and the specified content is received at the second device over the first network, and when communication between the first device and the second device over the first network is determined to be not possible, the content is specified via the second network by using the received content identifier, and the specified content is received at the second device over the second network, and wherein in the communicating, the content identifier is partially changed depending on over which of the first network and the second network the content is to be received, and the content is specified by using the partially changed content identifier.

6. The communication method according to claim 1, wherein in the transmitting, the common identifier for uniquely specifying the first device in both the first network that is a home network and the second network that is an external network is transmitted, and wherein in the receiving, the common identifier is received.

7. The communication method according to claim 1, wherein the first network is a network compatible with Wi-Fi (Wireless Fidelity), and wherein the second network is a network compatible with 3G network (3rd Generation network).

8. A communication method for communicating between a first device and a second device over one of a first network and a second network, the communication method comprising:

transmitting a common identifier from the first device to the second device over one of the first network and the second network, the common identifier being for uniquely specifying the first device in both the first network and the second network with different methods for specifying the first device;

receiving the common identifier at the second device; and communicating between the first device and the second device over one of the first network and the second network, wherein in the communicating, whether communication between the first device and the second device over the first network is possible is determined, when communication between the first device and the second device over the first network is determined to be possible, the first device is specified in the first network by using the received common identifier, and communication between the specified first device and the second device is performed over the first network, and when communication between the first device and the second device over the first network is determined to be not possible, the first device is specified in the second network by using the received common identifier, and communication between the specified first device and the second device is performed over the second network, wherein in the transmitting, the common identifier is transmitted from the first device to a third device that is a device in the second network and that is a device where the common identifier is to be held, when the common identifier is to be transmitted to the second device over the first network, the common identifier is transmitted to the second device by Universal Plug and Play, and when the common identifier is to be transmitted to the second device over the second network, the common identifier is transmitted to the second device via the third device, and wherein in the communicating, when the first device is to be specified in the first network, the first device is specified by using the common identifier and by Universal Plug and Play, and when the first device is to be specified in the second network, the first device is specified by using the common identifier and via the third device.

9. A communication method for communicating between a first device and a second device over one of a first network and a second network, the communication method comprising:

transmitting a common identifier from the first device to the second device over one of the first network and the second network, the common identifier being for uniquely specifying the first device in both the first network and the second network with different methods for specifying the first device;

receiving the common identifier at the second device; and communicating between the first device and the second device over one of the first network and the second network, wherein in the communicating, whether communication between the first device and the second device over the first network is possible is determined, when communication between the first device and the second device over the first network is determined to be possible, the first device is specified in the first network by using the received common identifier, and communication between the specified first device and the second device is performed over the first network, and when communication between the first device and the second device over the first network is determined to be not possible, the first device is specified in the second network by using the received common identifier, and communication between the specified first device and the second device is performed over the second network, wherein in the transmitting, the common identifier for uniquely specifying the first device by both Universal Plug and Play in the first network and peer-to-peer connection in the second network is transmitted, wherein in the receiving, the common identifier is received, and wherein in the communicating, when communication between the first device and the second device is to be performed over the first network, the first device and the second device communicate by Universal Plug and Play in the first network, and when communication between the first device and the second device is to be performed over the second network, the first device and the second device communicate by peer-to-peer connection in the second network.

* * * * *